Patented Oct. 14, 1947

2,429,097

UNITED STATES PATENT OFFICE 2,429,097

N,N'-DITHIODIMORPHOLINE AS A FUNGICIDE

Elbert C. Ladd, Passaic, N. J., assignor to United States Rubber Company, New York, N. Y., a corporation of New Jersey No Drawing. Application February 9, 1945, Serial No. 577,131

7 Claims. (Cl. 167—33)

This invention relates to new and useful improvements in fungicides. The invention further relates to methods of treating plants, and to methods of protecting organic material subject to attack by fungi, as the immunizing of seed, and the mildewproofing of fabrics and other material.

I have found that N,N'-dithiodimorpholine is an effective fungicide. This compound and a method of preparation are described in U. S. Patent to Blake No. 2,343,524. It is there called "morpholine disulfide."

The compound may be used as a seed protectant, and to protect plants, which term includes plant parts, or soil from microorganisms harmful to seeds and plants. It may also be applied to prevent or retard fungus growth and the formation of, for example, mildew on organic material such as rope, wood, fur, hair, feathers, cotton, wool, leather, paints, varnishes and the like. It may be applied as a dust undiluted or mixed with a powdered solid carrier, such as clay or talc, or as a liquid or a spray in a liquid carrier, as in solution in a suitable solvent, or suspended in a suitable nonsolvent, for example, water. Preferably when applied from suspension in a liquid carrier, the composition contains a dispersing agent for the chemical. It may be applied as to foliage by the aerosol method. Solutions for the aerosol treatment may be prepared by dissolving the chemical directly in the highly volatile liquid carrier or first dissolving the chemical in a less volatile solvent and then admixing such solution with the highly volatile liquid aerosol carrier. The compound may be used admixed with carriers that are active of themselves, for example, other fungicides, or bactericides, insecticides, insectifuges, fertilizers, hormones, buffering or softening agents.

The following examples are given to illustrate the invention:

Example I

A piece of cotton fabric was immersed in a 1% solution (by weight) of N,N'-dithiodimorpholine in acetone until the fabric was completely impregnated with the solution. Thereafter it was removed from the solution and air-dried to completely remove the acetone. The piece was then inoculated with *Chaetomium globosum* spore suspension and incubated for 15 days. A piece of cotton fabric treated with acetone only and dried (check) was inoculated with *Chaetomium globosum* spore suspension and incubated at the same time. At the end of the incubation period, it was observed that the material treated with N,N'-dithiodimorpholine was free of fungus growth whereas the untreated check piece was heavily overgrown with fungus.

Example II

In slide tests made on spores of the fungus *Sclerotinia fructicola* using the slide technique described by S. E. A. McCallan et al., Contributions Boyce Thompson Institute 4, 223 (1932); 9, 249, (1938); 10, 329, (1939); 12, 49 (1941); 12, 431 (1942), 50 parts of N,N'-dithiodimorpholine per million parts of water gave a 100% kill of the fungus and 5 parts of the chemical per million parts of water gave 46% kill of the fungus. The spores were 100% viable.

Having thus described my invention, what I claim and desire to protect by Letters Patent is:

1. A fungicidal composition comprising as an active ingredient N,N'-dithiodimorpholine, and a carrier therefor selected from the group consisting of clay and talc, and water containing a dispersing agent.

2. A fungicidal composition comprising a powdered solid carrier and as an active ingredient N,N'-dithiodimorpholine.

3. A fungicidal composition comprising an aqueous suspension of N,N'-dithiodimorpholine, said aqueous suspension containing a dispersing agent.

4. The method of controlling fungi on plants which comprises treating plants with N,N'-dithiodimorpholine.

5. The method of protecting seeds, plants and soil subject to attack or infestation by fungi which comprises treating said material with N,N'-dithiodimorpholine.

6. The method of immunizing seed which comprises treating said seed with N,N'-dithiodimorpholine.

7. The method of controlling fungi on living organisms which comprises treating said organisms with N,N'-dithiodimorpholine.

ELBERT C. LADD.

REFERENCES CITED

The following references are of record in the file of this patent:

UNITED STATES PATENTS

| Number | Name | Date |
|---|---|---|
| 2,343,524 | Blake | Mar. 7, 1944 |